(12) United States Patent
Guerra

(10) Patent No.: US 8,616,597 B2
(45) Date of Patent: Dec. 31, 2013

(54) NESTABLE TOOL HANDLE

(75) Inventor: Lawrence E. Guerra, Mission, KS (US)

(73) Assignee: Nicolay Family Enterprises, L.L.C., Fairway, KS (US)

( * ) Notice: Subject to any disclaimer, the term of this patent is extended or adjusted under 35 U.S.C. 154(b) by 0 days.

(21) Appl. No.: 13/595,412

(22) Filed: Aug. 27, 2012

(65) Prior Publication Data

US 2012/0324676 A1 Dec. 27, 2012

Related U.S. Application Data

(63) Continuation-in-part of application No. 12/859,844, filed on Aug. 20, 2010, now abandoned.

(60) Provisional application No. 61/236,769, filed on Aug. 25, 2009.

(51) Int. Cl.
*B25G 1/06* (2006.01)

(52) U.S. Cl.
USPC .............................................. 294/58; 294/57

(58) Field of Classification Search
USPC .................... 294/51, 178, 57, 58, 181; 16/426
See application file for complete search history.

(56) References Cited

U.S. PATENT DOCUMENTS

| | | | |
|---|---|---|---|
| 171,325 A | 12/1875 | Smith et al. | |
| 271,303 A | 1/1883 | Blaker | |
| 666,633 A | 1/1901 | Farmer | |
| D39,441 S | 8/1908 | Bain | |
| 930,660 A | 8/1909 | Gifford | |
| 1,032,535 A | 7/1912 | Ettinghaus | |
| 1,207,472 A | 12/1916 | Barton | |
| 1,486,758 A | 3/1924 | Jerram | |
| 1,519,892 A | 12/1924 | Webster | |
| 1,901,778 A | 3/1933 | Schlag | |
| D123,113 S | 10/1940 | Loud et al. | |
| 2,244,585 A * | 6/1941 | Tweit | 16/426 |
| D153,070 S | 3/1949 | Lund | |
| 2,545,585 A | 3/1951 | Montague | |
| 2,629,624 A | 2/1953 | Nelles | |
| 2,852,872 A | 9/1958 | Benz | |
| 2,933,836 A | 4/1960 | McKinley | |
| 3,023,021 A | 2/1962 | Fricke et al. | |
| 3,136,574 A | 6/1964 | Pasquale | |
| 3,223,383 A | 12/1965 | Hrabal | |
| 3,981,043 A | 9/1976 | Curry | |
| 4,125,951 A | 11/1978 | Huerth | |
| 4,354,702 A | 10/1982 | Clements et al. | |
| 4,669,206 A | 6/1987 | Yost | |
| D305,603 S | 1/1990 | Nelson et al. | |

(Continued)

*Primary Examiner* — Dean Kramer
(74) *Attorney, Agent, or Firm* — Erickson, Kernell, Derusseau & Kleypas, LLC

(57) ABSTRACT

A handle assembly is disclosed for tools such as shovels and the like having a primary handle and an auxiliary handle. The primary handle includes first and second legs, each of which has a first end that is securable to a tool head such that the first and second legs extend outwardly from the tool head in generally parallel relation to one another. A primary grip or handlebar extends between the legs at the ends opposite the tool head. The auxiliary handle is slideably connected to the first and second legs so as to be moveable toward and away from the primary grip. The auxiliary handle is removeably connectable to the legs and may be stored in a generally planar alignment between the legs to facilitate stacking or the auxiliary handle may be shaped to facilitate nesting of adjacent auxiliary handles of stacked handle assemblies.

21 Claims, 7 Drawing Sheets

(56) References Cited

U.S. PATENT DOCUMENTS

| | | |
|---|---|---|
| 5,048,883 A | 9/1991 | Waluk |
| D333,074 S | 2/1993 | Ciccarelli |
| 5,197,772 A | 3/1993 | Stecyk |
| 5,395,147 A | 3/1995 | Brown et al. |
| 5,499,852 A | 3/1996 | Seigendall |
| D380,360 S | 7/1997 | Scruggs |
| 5,669,163 A | 9/1997 | Winter |
| 5,782,518 A | 7/1998 | Scruggs |
| 5,887,920 A | 3/1999 | Perciful |
| 5,921,600 A | 7/1999 | Lucas |
| 5,974,775 A | 11/1999 | Niehuss |
| 6,062,619 A | 5/2000 | Clark, Jr. |
| 6,592,160 B1 | 7/2003 | Nicolay et al. |
| 6,820,628 B2 | 11/2004 | Larson |
| 7,124,474 B2 | 10/2006 | Nicolay et al. |
| D626,388 S * | 11/2010 | Greenly et al. .................. D8/10 |

\* cited by examiner

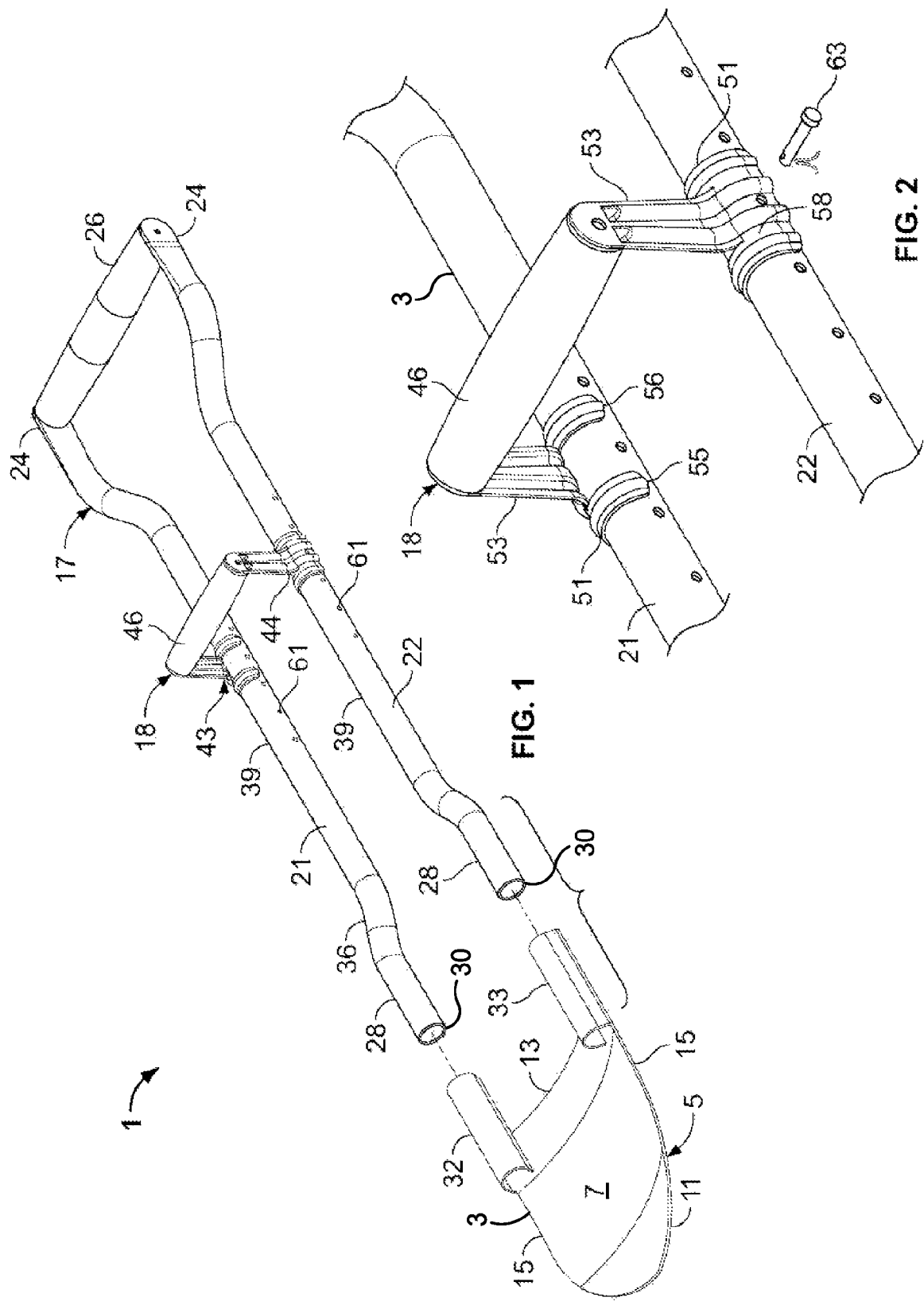

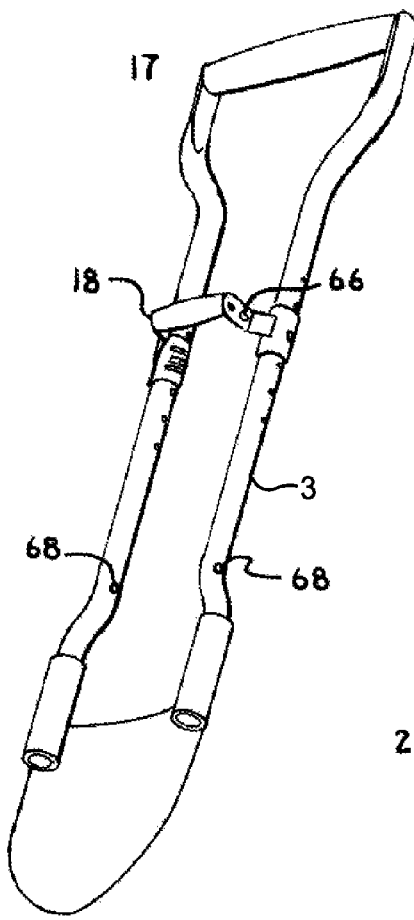
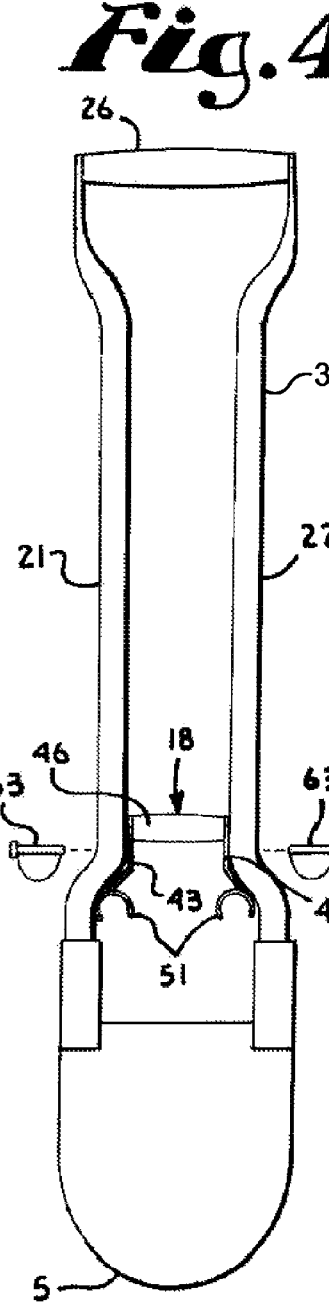
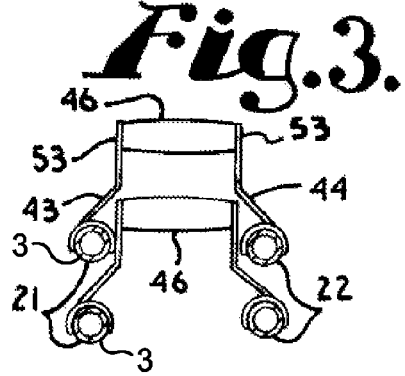
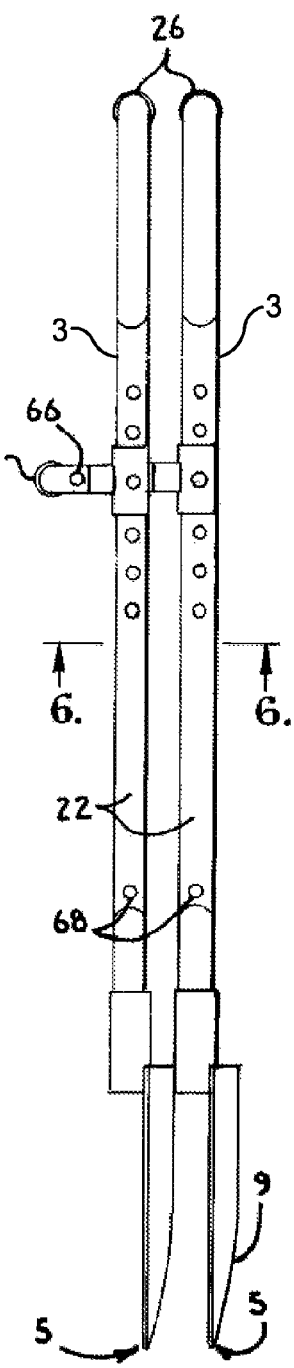

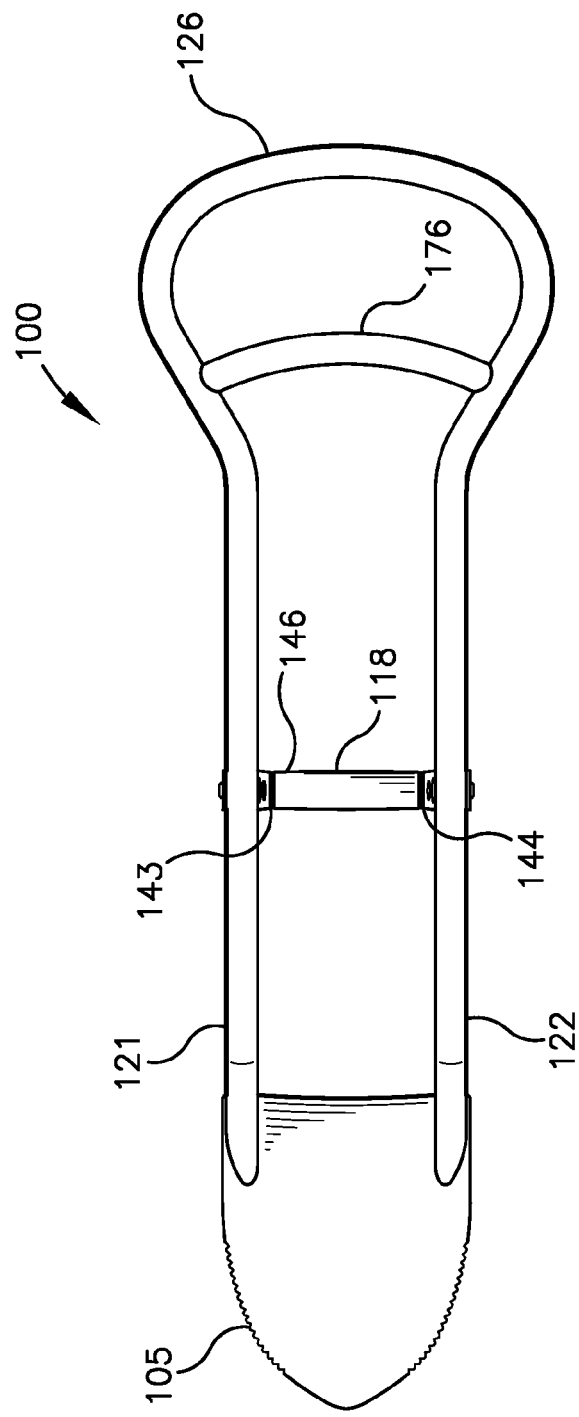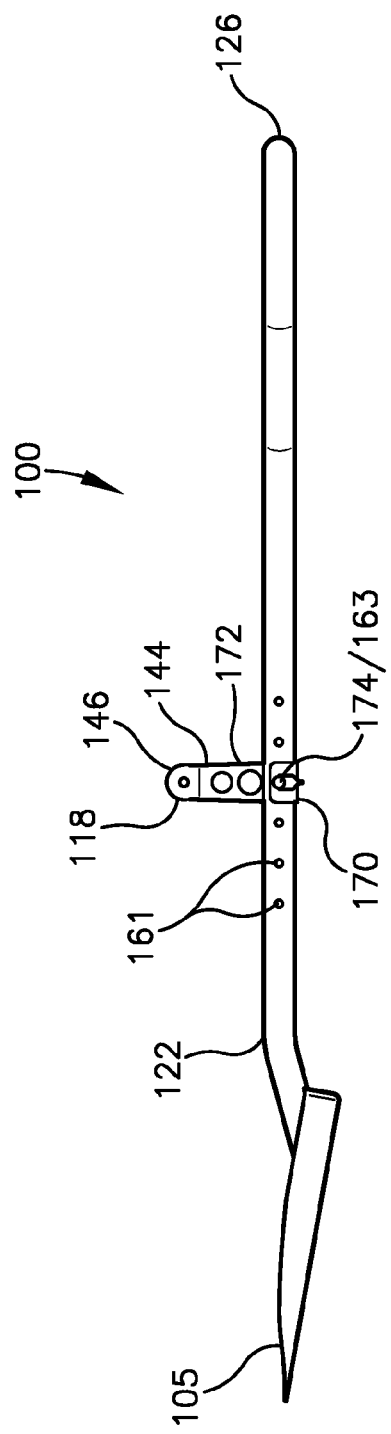

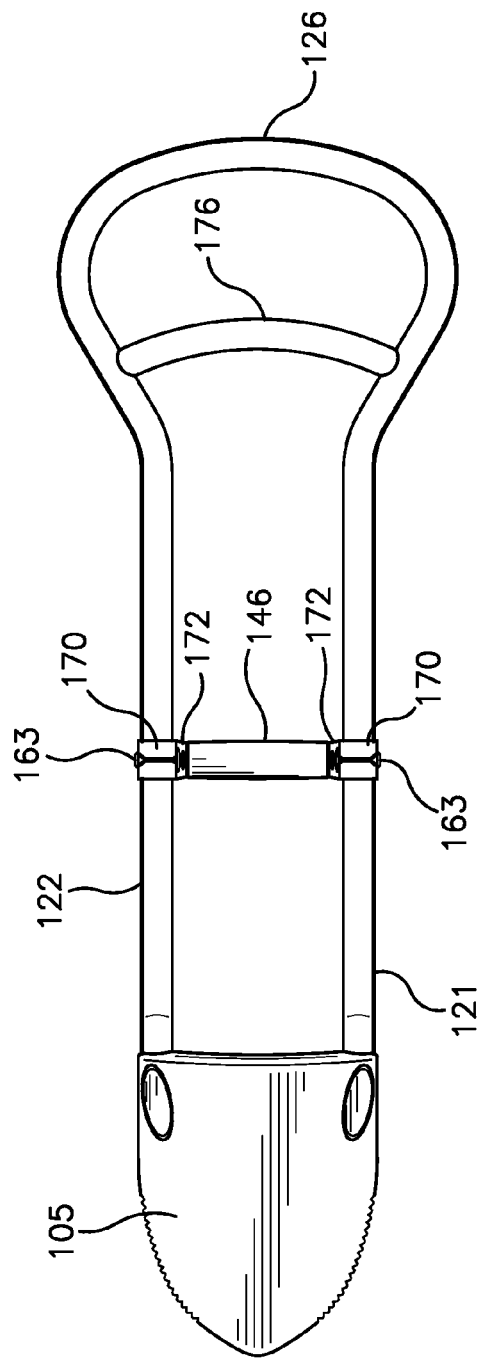
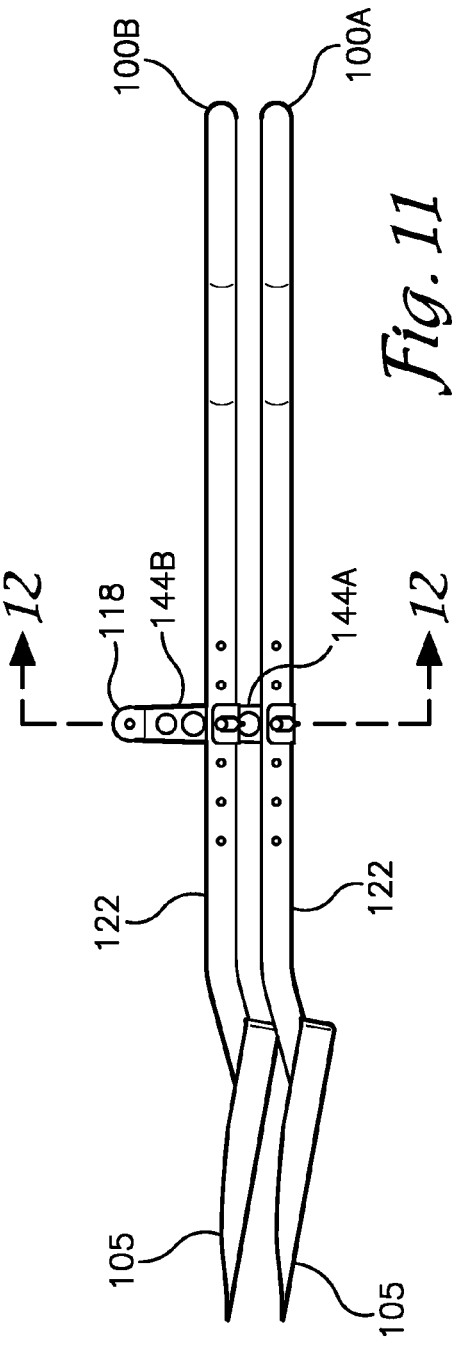

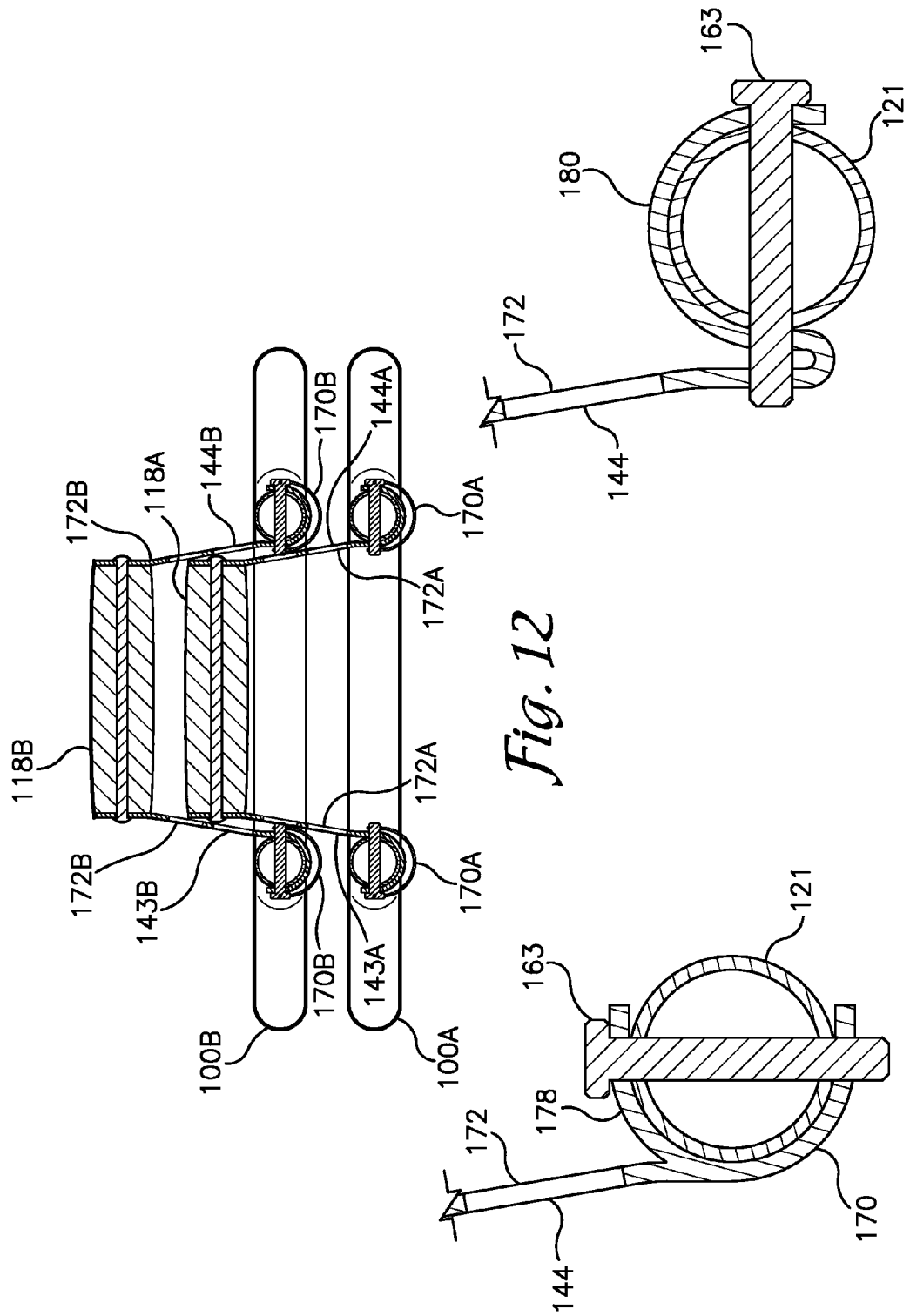

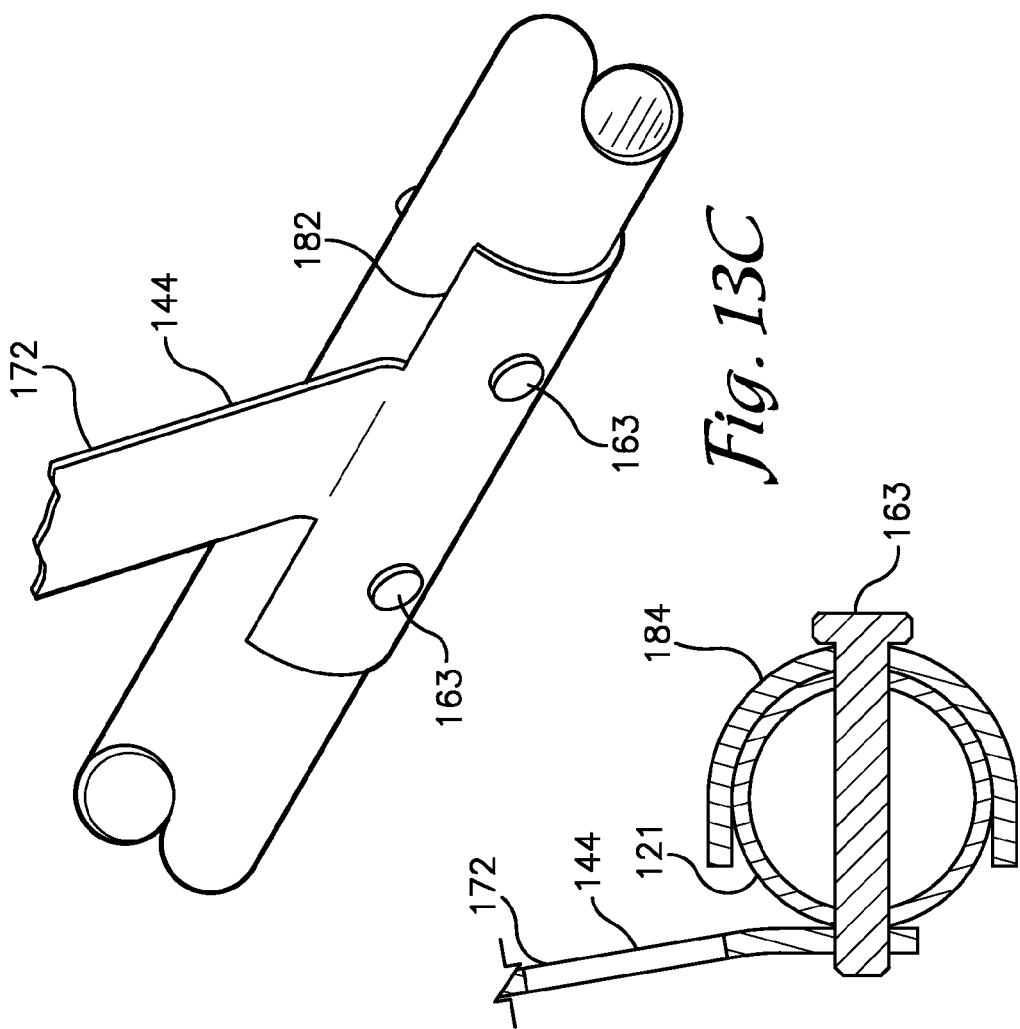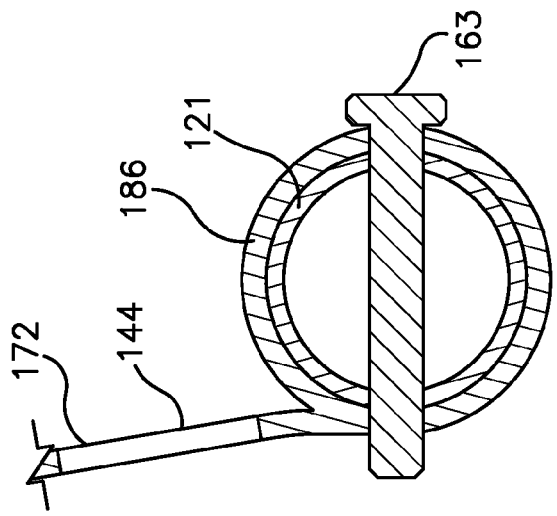

NESTABLE TOOL HANDLE

CROSS-REFERENCE TO RELATED APPLICATIONS

This application is a continuation-in-part of U.S. patent application Ser. No. 12/859,844, filed Aug. 20, 2010 which claims the benefit of U.S. Provisional Patent Application Ser. No. 61/236,769, filed Aug. 25, 2009, under 35 U.S.C. §119(e). The disclosures of each of which are hereby incorporated herein, in their entirety, by reference.

FIELD OF THE INVENTION

This invention relates to an improved handle for use on tools such as shovels and the like.

BACKGROUND

Tools such as shovels (including snow shovels, spades, and scoops), forks, brooms, hoes, and the like typically have handles comprising a single straight shaft which is secured to a head of the tool along a central axis of the tool head. One problem with such tool handles arises when the user must lift the tool head off of the ground in order to dump or expel a load therefrom. To lift the tool, the user must bend over at the waist, grasp the handle near the tool head, and lift the tool using his back. Lifting with the back in this manner often causes strain or injury to the user's back. Previous attempts to address this problem include U.S. Pat. Nos. 5,499,852, 5,921,600 and 6,062,619, which describe auxiliary handles for attachment to a single shaft tool handle, the auxiliary handles being intended to extend upwardly from the primary tool handle shaft so that the user does not have to bend over as far in order to lift the tool head. In addition, U.S. Pat. No. 171,325 discloses a drag rake handle having a pair of limbs mounted at an acute angle to one another and having an auxiliary handle mounted between the limbs. The auxiliary handle may be mounted so as to extend upwardly from the limbs.

None of these previous attempts to provide tool handles which facilitate lifting appear to have gained widespread use, and therefore there remains a need for an ergonomically designed tool handle which is relatively easy to use and which facilitates lifting.

SUMMARY

The present invention comprises a handle for tools such as shovels and the like. The handle includes first and second legs, each of which has a first end which is securable to a tool head such that the first and second legs extend outwardly from the tool head in generally parallel relation to one another. The tool head may include first and second mounting sleeves disposed on opposite sides of the tool head for mounting the first ends of the first and second legs. A handlebar or primary grip is connected between the second ends of the first and second legs. A lower handle or auxiliary handle is slidably connected to the first and second legs so as to be moveable toward and away from the handlebar.

The auxiliary handle assembly comprises first and second mounting members, each having a semi-enclosed base and a support arm extending therefrom. The support arms of each mounting member secure the auxiliary handle therebetween. The semi-enclosed base of each mounting member receives a middle portion of the respective first or second leg and is removeably connectable to the first and second legs. When the auxiliary handle is connected thereto, the support arms, and connected auxiliary grip, extend outward from a plane defined by the first and second legs. A pin or slide lock is provided for selectively securing the auxiliary handle to the first and second legs. The auxiliary handle may be removed from the perpendicular or transverse alignment with the legs and stored between the legs prior to sale to facilitate shipping and display.

Alternatively the auxiliary handle may be shaped to allow the tool handle assemblies to be stacked on top of each other with lower handles of adjacent tool handle assemblies nested together, one within the other.

DESCRIPTION OF THE DRAWINGS

Illustrative embodiments of the invention are described in detail below with reference to the attached drawing figures, and wherein:

FIG. 1 is a perspective view of a shovel with a tool handle assembly depicted in accordance with an embodiment of the invention;

FIG. 2 is an enlarged, fragmentary and exploded perspective view of the tool handle assembly of FIG. 1;

FIG. 3 is a perspective view of the shovel of FIG. 1 with an alternative embodiment of the auxiliary handle depicted in accordance with an embodiment of the invention;

FIG. 4 is a front plan view of the shovel as shown in FIG. 3 depicting the auxiliary handle removed from a perpendicular alignment and stored between spaced apart legs of the tool handle assembly in accordance with an embodiment of the invention;

FIG. 5 is a side view showing two tool handle assemblies stacked together with the auxiliary handles of adjacent tool handle assemblies nested together in accordance with an embodiment of the invention;

FIG. 6 is a cross-sectional view taken along line 6-6 of FIG. 5;

FIG. 8 is a front plan view of the tool assembly of FIG. 7;

FIG. 9 is a side elevational view of the tool assembly of FIG. 7;

FIG. 10 is a back plan view of the tool assembly of FIG. 7;

FIG. 11 is a side elevational view of two of the tool assemblies of FIG. 7 in a stacked configuration in accordance with an embodiment of the invention;

FIG. 12 is a cross-sectional view taken along line 12-12 of FIG. 11; and FIGS. 13A-E depict alternative, exemplary configurations of the mounting members for an auxiliary handle.

DETAILED DESCRIPTION

Figure 7:
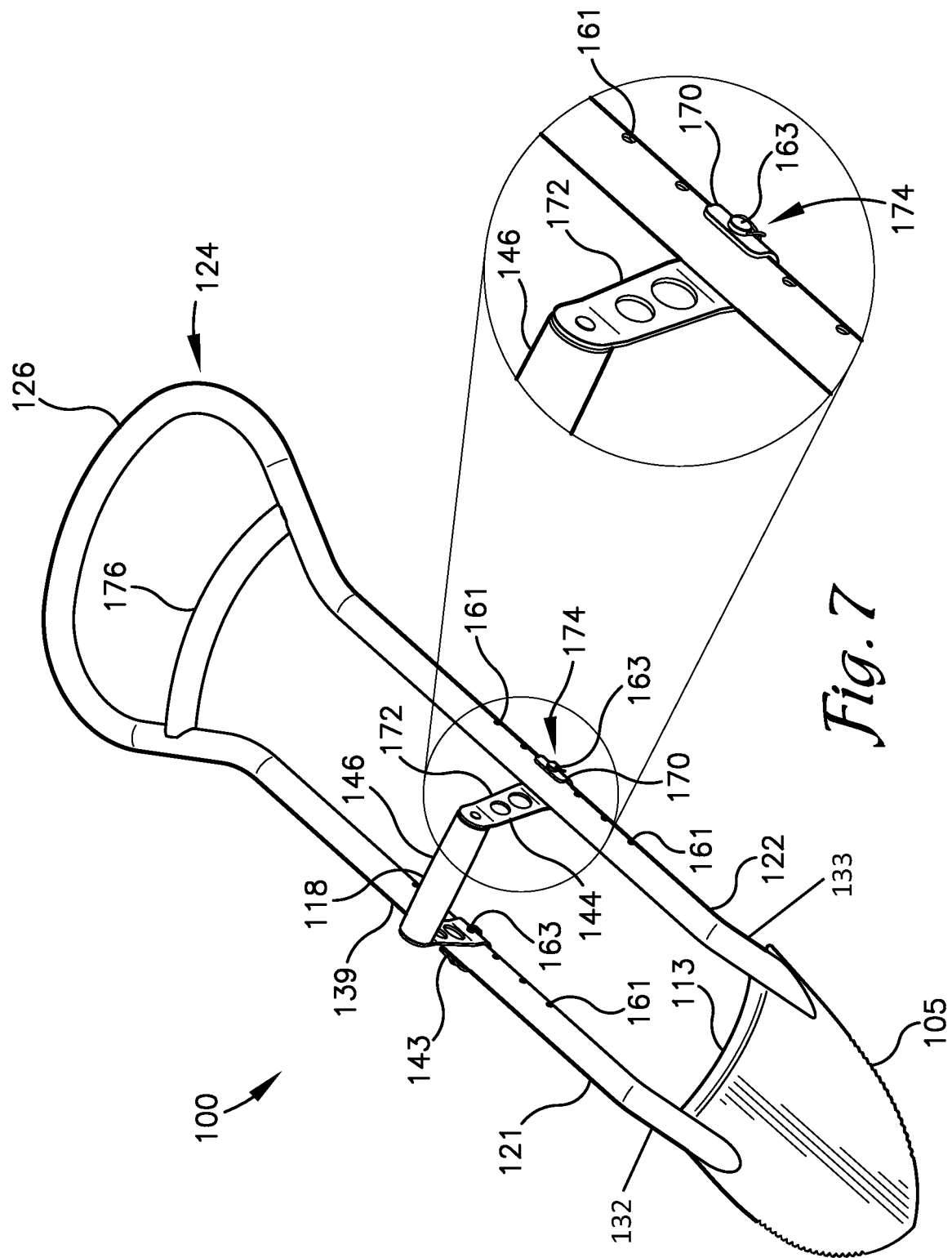
FIG. 7 is a perspective view of tool assembly with a nestable auxiliary handle depicted in accordance with an embodiment of the invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words upwardly, downwardly, rightwardly, and leftwardly will refer to directions in the drawings to which reference is made. The words inwardly and outwardly will refer to directions toward and away from, respectively, the geometric center of the embodiment being described and designated parts thereof. The terminology will include the words specifically mentioned, derivatives thereof and words of a similar import.

Referring to the drawings in more detail, the reference number 1 generally designates a tool handle assembly embodying the present invention. The handle 1 is shown in FIGS. 1-4 as being part of a spade or shovel 3 having a conventional shovel blade 5. The blade 5 includes a front surface 7, a rear surface 9, a lower edge 11, an upper edge 13, and opposed side edges 15. It is to be understood, however, that the handle 1 is easily adaptable for use on various types of shovels including snow shovels and scoop shovels, as well as on other types of tools such as forks, rakes, brooms, hoes and the like having tool heads other than shovel blades.

Referring to FIG. 1, the handle assembly 1 generally comprises a primary handle 17 and an auxiliary handle 18. The primary handle 17 includes first and second spaced apart legs 21 and 22. The legs 21, 22 are connected at respective first or upper ends 24 by an upper or primary grip 26, which may be formed of wood or plastic and bolted in place between the legs 21 and 22. The portion of the tubing forming the legs 21 and 22 as shown is flattened at the upper ends 24 to facilitate connection of the upper grip 26 therebetween.

Each of the legs 21 and 22 has a tool head attachment portion 28 at a second end thereof opposite the first end 24. The attachment portions 28 are connectable to the blade 5 by conventional means such as screws, bolts, rivets, spot welding, removable pins or the like such that the legs 21 and 22 extend upwardly or outwardly past the upper edge 13 of the blade 5 in parallel spaced relation to one another. The blade 5 as shown may have a pair of handle mounting sleeves 32 and 33 formed or mounted on the blade 5 by welding or the like proximate opposed side edges 15 to receive the lower end 30 of a respective leg 21 or 22. The leg 21, 22 may then be secured in place in the sleeve 32, 33 by well known fastening means including screws, bolts, rivets, removable pins, spot welding or the like. Use of removable pins or other releaseable securement means would permit use of the tool handle assembly 1 with different tool heads including different types of shovels, rakes, brooms, hoes and scrapers.

The attachment portions 28 are preferably connected to the blade 5 proximate its side edges 15. In the embodiment shown the attachment portions of the legs 21, 22 are shown attached to the front surface 7 of the blade. It is foreseen that the attachment portions could be attached to the rear surface 9, such as for a snow shovel, or along the side edges 15. As shown, the legs 21 and 22 include an inwardly offset section 36, above the upper edge 13 of the blade 5, which spaces the legs 21 and 22 closer together than the attachment portions 28. The attachment portions 28 should not be spaced any closer to one another than will allow a user to easily insert a foot therebetween to push down on the upper edge 13 of the blade 5.

The legs 21 and 22 also flare outward proximate the upper ends 24 thereof to accommodate the upper grip 26 and to provide sufficient spacing therebetween to comfortably accommodate the hand of a user. Medial portions 39 of the legs 21 and 22 are straight and extend in parallel, spaced apart relation to one another.

The lower or auxiliary handle 18 is slideably securable to the legs 21 and 22. The auxiliary handle 18 includes mounting members 43 and 44 and an auxiliary grip 46 which is bolted to and between the mounting members 43 and 44. Each mounting member 43 and 44 shown is stamped from a single piece of sheet metal to form a semi-enclosed or semi-cylindrical base 51 and a support arm 53 projecting outward therefrom. The base 51 includes first and second curved fingers 55 and 56 extending in a first direction on opposite sides of the support arm 53 (which may also be described as a middle finger) and a curved palm portion 58 extending in a second direction relative to the curved fingers 55 and 56. The fingers 55 and 56 and the palm portion 58 extend circumferentially approximately 180 degrees or slightly greater so that the base 51 may be secured around an associated leg 21 or 22 and slide relative thereto.

The position of the auxiliary handle 18 relative to the legs 21 and 22 is adjustable to accommodate users of various sizes by sliding the mounting members 43 and 44 up or down the legs 21 and 22. A plurality of longitudinally spaced holes 61 is formed in each leg 21 and 22 and selectively alignable with one or more holes in the base 51 of the mounting members 43 and 44. The position of the auxiliary handle 18 relative to the legs 21 and 22 may be fixed using a locking pin 63 removeably positionable through aligned holes in the mounting members 43 and 44 and in the legs 21 and 22.

When secured to the legs 21 and 22 with the base 51 of each mounting member 43 and 44 secured around an associated leg 21, 22, the support arms 53 project upward from a plane extending through the medial portions 39 of the spaced apart legs 21 and 22. The auxiliary grip 46 is then connected between the distal ends of each support arm 53 and spaced above the plane extending through the legs 21 and 22. The auxiliary grip 46 extends perpendicular or generally transverse to the legs 21 and 22.

In use, the auxiliary handle 18 serves to make the shovel 3 much easier to lift than is the case with a conventional shovel. The user of a conventional shovel must bend substantially at the waist in order to reach down and grip the handle of the shovel near the blade so that he can lift the shovel and throw the contents of the blade out of the way. Because the user must reach down so far to grab the handle, it is difficult for the user to bend at the knees to facilitate lifting with his legs. The user is, therefore, forced to lift with his back, which will often result in back strain. With the shovel of the present invention, however, the user can grasp the lower or auxiliary handle 18 without bending over nearly as far at the waist. He is then able to bend at the knees to get in position to lift with his legs, sparing unnecessary injury or strain to his back.

The dual legs 21 and 22 of the handle 1 also act to make the shovel 3 easier to use than a conventional shovel. When a user lifts a conventional shovel with a load supported on the blade, the weight of the load is often unbalanced and tends to create a torsional force on the handle. If the user does not grip the handle sufficiently tightly, this torsional force will cause the shovel to rotate or roll about its handle, thereby spilling the load. Constantly gripping the handle tightly enough to offset this torsional force adds to the user's fatigue. The dual legs 21 and 22 of the present invention move the supports for the blade 5 and the load supported thereon outwardly, thereby providing a lever arm which helps to counter the rotational forces.

Auxiliary handle 18 is preferably removeably securable to the legs 21 and 22 so that it does not interfere with stacking of multiple handle assemblies 1 or shovels 3 for transport or display. Referring to the embodiment shown in FIGS. 3-6, the auxiliary grip 46 and mounting members 43 and 44 of the auxiliary handle 18 may be sized and shaped to be positioned with the grip 46 extending between the legs 21 and 22 and the support arms 53 of each mounting member 43 and 44 extending inside of the legs 21 and 22 proximate the inwardly offset sections 36 thereof. One or more holes 66 may be formed in each of the support arms 53 which can be aligned with corresponding holes 68 formed in the legs 21 and 22 proximate the offset sections 36 so that the pins 63 may be used to removeably secure the auxiliary handle 18 between the legs 21 and 22 as shown such that the auxiliary grip 46 generally extends in planar alignment with the first and second legs 21 and 22.

The tool handle assembly 1 can then be shipped or stored on store displays with the auxiliary handle 18 positioned between and generally in planar alignment with the legs 21 and 22 to facilitate stacking of multiple shovels 3 or the like. The purchaser can then remove the auxiliary handle 18 from the stored position and attach it in a perpendicular alignment with the legs 21 and 22 as described above.

Referring to FIGS. 5 and 6, it is also foreseen that the mounting members 43 and 44 and the auxiliary grip 46 could be sized and shaped to allow auxiliary handles 18 on adjacent tool handle assemblies 1 to nest together. More specifically, the support arms could angle inward from a base end to the distal end to which the auxiliary grip 46 is attached and the auxiliary grip 46 of each auxiliary handle 18 is narrower than the distance between first and second legs 21 and 22. The narrower auxiliary grip 46 of a first tool handle assembly 1 then fits between the first and second legs 21 and 22 of a second tool handle assembly 1 positioned over the first tool handle assembly 1 and between the angled portion of the support arms 43 and 44.

As depicted in FIGS. 7-12, a tool handle assembly 100 is depicted in accordance with an alternative embodiment of the invention. The tool handle assembly 100 includes features and/or components similar to those described above for the tool handle assembly 1. Those similar components of the tool handle assembly 100 are provided with reference numerals having matching second and third digits, e.g. leg 21 and leg 121 comprise similar components. Features of these components are not described in detail again except where necessary to describe embodiments of the invention.

The assembly 100 includes first and second legs 121, 122, a primary grip 126, and a blade 105 or other tool head similar to that described previously for the tool handle assembly 1. In the embodiment depicted in FIGS. 7-12, the blade 105 is preferably coupled to the legs 121, 122 at a slight angle, such as between about 0° and about 45° or more preferably between about 5° and about 20° or about 15°. To provide the angled coupling the ends of the legs 121, 122 can be bent or formed at an angle and/or the mounting sleeves 132, 133 can be coupled to the blade 105 at an angle. The mounting sleeves 132, 133 might also be coupled to the blade 105 at a slight offset from the upper edge 113 of the blade 105. Such an angled and/or offset configuration aids to enable a user to apply pressure to the blade 105 using their foot on the upper edge 113 of the blade 105 without the user's knee contacting or being obstructed by the handle assembly 100.

The tool handle assembly 100 also includes an additional optional cross member 176 extending between the first and second legs 121, 122 and positioned spaced apart from the primary grip 126. The cross member 176 may provide additional rigidity to the assembly 100, may provide an additional gripping location for a user, and/or may be included to improve aesthetics of the assembly 100 design.

The assembly 100 also includes an auxiliary handle 118 that includes first and second mounting members 143, 144, and an auxiliary grip 146. The auxiliary grip 146 and the first and second mounting members 143, 144 may be formed as a single component, from any acceptable material such as plastic or metal. The auxiliary handle 118 is configured to enable a plurality of the tool handle assemblies 100 to be stacked or tightly positioned with the auxiliary handle 118 of the lower assembly 100 nested between the first and second legs 121, 122 of adjacent or overlying assemblies 100.

The auxiliary grip 146 is configured with a length that is less than the spacing between the first and second legs 121, 122 to enable passage of the grip 146 between the legs 121, 122 when oriented transverse thereto. The first and second mounting members 143, 144 are configured to extend from a side of the respective first and second legs 121, 122 that is substantially within the space between the first and second legs 121, 122. The first and second mounting members 143, 144 extend from points along or adjacent to the sides of the first and second legs 121, 122 at an angle that is at least partially directed into the space between the first and second legs 121, 122.

As depicted in FIGS. 7-12, the first and second mounting members 143, 144 comprise J-shaped members with a curved base 170 and a support arm 172 extending therefrom. A free end of each of the support arms 172 is coupled to a respective end of the auxiliary grip 146. The support arms 172 extend from their free ends to the curved bases 170 along a generally linear path but, may curve, bend, or be otherwise formed as desired. The curved bases 170 extend from each support arm 172 opposite the free ends and curve outwardly or away from the opposite mounting member 143, 144. The curved bases 170 provide an arc that is configured to receive the respective first or second leg 121, 122 therein. The curved bases 170 extend at least halfway or about 180 degrees around the received first or second legs 121, 122. In an embodiment, the curved bases 170 extend greater than about halfway around the first or second legs 121, 122 to releaseably engage the legs 121, 122 therein.

With reference to FIGS. 13A-E, although the mounting members 143, 144 are described a being J-shaped members, they can take on a variety of other configurations without departing from the scope of embodiments of the invention described herein. For example, and without limitation, the mounting members 143, 144 might be configured with an additional leg 178 that forms a C-shape with the curved base 170 (FIG. 13A) or with a leg 180 that is used instead of the curved base 170 (FIG. 13B). Or the curved base 170 might be omitted in lieu of one or more arms 182 that extend transversely to the support arms 172 along the legs 121, 122 to engage the fasteners 163 inserted therethrough (FIG. 13C) or a second separate component 184 might be coupled to respective mounting members 143, 144 and around the legs 121, 122 (FIG. 13D). Alternatively, as shown in FIG. 13E, a curved base 186 might form a hollow cylinder or sleeve at a distal end of the support arm 172 through which a respective one of the legs 121, 122 is inserted. Locking pins 163 or studs might also be integrated into the mounting members 143, 144 and extend through holes 161 in the first and second legs 121, 122. In yet another embodiment, the support arms 172 pivotally couple to the bases 170 to allow pivotal adjustment and/or movement of the auxiliary handle 118 with respect to the first and second legs 121, 122. Other configurations are foreseen and are within the scope of embodiments described herein.

An aperture 174 is provided through each of the curved bases 170 and/or the support arms 172. The apertures 174 are aligned with corresponding holes 161 in the first and second legs 121, 122 to receive a locking pin 163 therethrough for removeably securing the auxiliary handle 118 to the first and second legs 121, 122. In one possible embodiment, the locking pin 163 is fixedly disposed in the apertures 174 to permanently secure the auxiliary handle 118 to the legs 121, 122.

As depicted in FIG. 11, the configuration of the auxiliary handle 118 enables the tool handle assembly 100 to be stacked with one or more other identical or similar tool handle assemblies like, for example, the tool handle assemblies 100A and 100B as depicted in FIG. 11 (A and B designations are provided to aid description of the nesting of two handle assemblies and do not indicate any differences therebetween other than their relative position). Two or more of the assemblies 100 are placed generally parallel to one another with their auxiliary handles 118 directed in the same direction. The auxiliary handle 118A of the first assembly 100A (positioned below or behind the second assembly 100B) is inserted between the first and second legs 121B, 122B of the second assembly 100B. The auxiliary handle 118A of the first assembly 100A nests within the auxiliary handle 118B of the second assembly 100B, e.g. between the support arms 172B of the first and second mounting members 143B, 144B. The auxiliary handle 118A fully nests within the auxiliary handle 118B to abut the auxiliary handle 118B or follows along the mounting members 143B, 144B to a point at which the auxiliary handle 118A is pinched therebetween as depicted in FIGS. 11 and 12. Alternatively, the handle assemblies 100A, 100B might nest with the first assembly 100A longitudinally offset with respect to the second assembly 100B such that the auxiliary handle 118A of the first assembly 100A is positioned to one side of the auxiliary handle 118B of the second assembly 100B.

The mounting members 143, 144 can include one or more features along their inner and/or outer sides to aid in the nesting of the auxiliary handles 118A, 118B. For example, the mounting members 143, 144 might include a rib or flange (not shown) extending from the support arms 172 at a location between the bases 170 and the auxiliary grip 146 and along the outer surface thereof. A corresponding channel (not shown) extending along the interior surface of the support arms 172 might also be provided. Upon alignment of the auxiliary handle 118A with the auxiliary handle 118B for nesting, the ribs on the mounting members 143A, 144A engage the channels on the mounting members 143B, 144B and direct the movement of the auxiliary handle 118A into the nesting relationship with the auxiliary handle 118B. The ribs and channels can also aid to maintain the nesting relationship against longitudinal movement of the auxiliary handle 118A with respect to the auxiliary handle 118B. Other similar features and arrangements thereof might also be employed in embodiments of the invention.

The assemblies 100A, 100B can thus be stacked or placed in a tightly packed relationship in which the assemblies 100A, 100B are oriented generally parallel and in close proximity to one another and do not require additional spacing therebetween for the auxiliary handles 118. This configuration helps to minimize space and size requirements for shipping, storage, and display of the assemblies 100. In one possible embodiment, a plurality of the tool handle assemblies 100 have differing tool heads and are similarly stackable or nestable for shipping, storage, and display.

It is to be understood that while certain forms of the present invention have been illustrated and described herein, it is not to be limited to the specific forms or arrangement of parts described and shown.

What is claimed is:

1. A tool comprising:
    a tool head;
    a tool handle that includes a primary grip and first and second legs, each of the first and second legs having a first end and a second end, the first ends of the first and second legs connected to the tool head such that the first and second legs extend outwardly from the tool head in generally parallel relation to one another, the primary grip being connected between the second ends of the first and second legs; and
    an auxiliary-handle assembly including first and second mounting members disposed between the first and second legs with an auxiliary grip extending between said first and second mounting members, the first and second mounting members releaseably coupling to the first and second legs respectively,
    wherein the tool comprises a first tool and the auxiliary grip of the first tool is narrower than the spacing between the first and second legs of the first tool, the auxiliary-handle assembly of the first tool fits between first and second legs of a similarly constructed second tool oriented such that the auxiliary grip of the second tool extends in the same direction as the auxiliary grip of the first tool, and the first and second tools are stackable with the auxiliary-handle assembly of the first tool at least partially passing between and beyond the first and second legs of the second tool.

2. The tool of claim 1, wherein the first and second mounting members further comprise a support arm and curved base that form a J-shaped member.

3. The tool of claim 1, wherein the first and second mounting members further comprise a support arm and a curved base, and wherein the curved bases extend in opposite directions from one another and at least approximately 180 degrees around the circumference of first and second legs respectively.

4. The tool of claim 3, wherein the curved bases of the first and second support members extend greater than about 180 degrees around the circumference of the first and second legs respectively.

5. The tool of claim 1, wherein the first and second mounting members angle inward toward the auxiliary grip.

6. The tool of claim 1, wherein each of the first and second mounting members is securable to a respective first and second leg by securing a pin through a hole in the respective first and second mounting members and an aligned hole in the first and second legs, the aligned hole in the first and second legs selected from one of a plurality of holes formed in the first and second legs.

7. The tool of claim 1, wherein the auxiliary-handle assembly is removable from the first and second legs.

8. The tool of claim 1, wherein the tool head includes first and second handle mounting sleeves disposed on opposite sides thereof that receive the first ends of the first and second legs respectively.

9. The tool of claim 1, further comprising:
    a cross member that extends between the first and second legs adjacent to and spaced apart from the primary grip.

10. A tool comprising:
    a tool head;
    a tool handle that includes a primary grip and first and second legs, each of the first and second legs having a first end and a second end, the first ends of the first and second legs connected to the tool head such that the first and second legs extend outwardly from the tool head in generally parallel relation to one another, the primary grip being connected between the second ends of the first and second legs; and
    an auxiliary-handle assembly including first and second mounting members disposed between the first and second legs with an auxiliary grip extending between said first and second mounting members, the first and second mounting members releaseably coupling to the first and second legs respectively, wherein the tool comprises a first tool and the auxiliary grip of the first tool is narrower than the spacing between the first and second legs of the first tool, the auxiliary-handle assembly of the first tool fits between first and second legs of a similarly constructed and oriented second tool, and the first and second tools are stackable with the auxiliary-handle assembly of the first tool at least partially passing between and beyond first and second legs of the second tool;

wherein the auxiliary grip of the first tool nests between first and second mounting members of the auxiliary-handle assembly of the second tool.

11. A tool comprising:

a tool head;

a tool handle that includes a primary grip and first and second legs, each of the first and second legs having a first end and a second end, the first ends of the first and second legs connected to the tool head such that the first and second legs extend outwardly from the tool head in generally parallel relation to one another, the primary grip being connected between the second ends of the first and second legs; and an auxiliary-handle assembly that includes first and second mounting members with a curved base and a support arm extending therefrom, the support arms of the first and second mounting members being disposed between the first and second legs and securing an auxiliary grip therebetween, and the curved bases of the first and second mounting members extending in opposite directions to one another and receiving the first and second legs respectively.

12. The tool of claim 11, wherein the support arm and curved base of the first and second mounting members forms a J-shaped member.

13. The tool of claim 11, wherein the auxiliary grip is narrower than the spacing between the first and second legs and a plurality of the tools are stackable with their auxiliary grips nested between the first and second legs of the respective adjacent tool.

14. The tool of claim 13, wherein the auxiliary grip is nested between the support arms of the first and second mounting members of the respective adjacent tool.

15. Nested tool-handle assemblies comprising:

a first tool-handle assembly and a second tool-handle assembly aligned in a substantially parallel orientation and each including a tool handle that includes a primary grip and first and second legs, each of the first and second legs having a first end and a second end, the first ends of the first and second legs configured to couple to a tool head such that the first and second legs extend outwardly from the tool head in generally parallel relation to one another, the primary grip being connected between the second ends of the first and second legs, and an auxiliary-handle assembly that includes first and second mounting members disposed between the first and second legs and securing an auxiliary grip therebetween, and the first and second mounting members releaseably coupling to the first and second legs respectively, wherein the auxiliary grip passes between and at least partially beyond the first and second legs of the second tool handle assembly and the auxiliary-handle assembly of the first tool handle assembly is nested between the first and second legs of the second tool handle assembly.

16. The nested tool-handle assemblies of claim 15, wherein the auxiliary-handle assembly of the first tool-handle assembly is nested between the first and second mounting members of the second tool-handle assembly.

17. The nested tool-handle assemblies of claim 15, wherein the auxiliary-handle assembly of the first tool-handle assembly is longitudinally offset from the auxiliary-handle assembly of the second tool-handle assembly.

18. The nested tool handle assemblies of claim 15, wherein the first and second mounting members each include a curved base, the curved bases extending in opposite directions to one another and receiving the first and second legs respectively.

19. A handle for a tool having a tool head, the handle comprising;

a primary grip and first and second legs, each of the first and second legs having a first end and a second end, the first ends of the first and second legs connectable to the tool head such that the first and second legs extend outwardly from the tool head in generally parallel relation to one another, the primary grip being connected between the second ends of the first and second legs; and an auxiliary-handle assembly including first and second mounting members disposed between the first and second legs with an auxiliary grip extending between distal ends of said first and second mounting members, the first and second mounting members releaseably coupling to the first and second legs respectively, the auxiliary-handle assembly being enabled to pass between and at least partially beyond first and second legs of a similarly configured and oriented second handle for a tool and to nest at least partially between first and second mounting members of an auxiliary-handle assembly of the second handle for a tool.

20. The handle for a tool as in claim 19, wherein the first handle for a tool is stackable with the second handle for a tool such that the auxiliary-handle assembly of the first handle nests between the first and second legs of the second handle.

21. The handle for a tool as in claim 19, wherein the first and second mounting members each include a curved base, the curved bases extending in opposite directions to one another and receiving the first and second legs respectively.

\* \* \* \* \*